(12) United States Patent
Lin

(10) Patent No.: US 9,839,846 B2
(45) Date of Patent: Dec. 12, 2017

(54) METHOD AND DEVICE FOR DISPLAYING FRAMES OF A GAME

(71) Applicant: Tencent Technology (Shenzhen) Company Limited, Shenzhen (CN)

(72) Inventor: Baike Lin, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 546 days.

(21) Appl. No.: 14/597,113

(22) Filed: Jan. 14, 2015

(65) Prior Publication Data

US 2015/0141119 A1    May 21, 2015

Related U.S. Application Data

(63) Continuation of application No. PCT/CN2014/082017, filed on Jul. 11, 2014.

(30) Foreign Application Priority Data

Sep. 23, 2013 (CN) .......................... 2013 1 0437118

(51) Int. Cl.
 *A63F 13/44* (2014.01)
 *A63F 13/493* (2014.01)

(52) U.S. Cl.
 CPC ............ *A63F 13/493* (2014.09); *A63F 13/44* (2014.09)

(58) Field of Classification Search
 CPC ............................... A63F 13/44; A63F 13/493
 See application file for complete search history.

(56) References Cited

U.S. PATENT DOCUMENTS 9,473,758 B1 * 10/2016 Long .................. H04N 13/0242
2003/0190951 A1 * 10/2003 Matsumoto ............. A63F 13/10
463/30

(Continued)

FOREIGN PATENT DOCUMENTS

CN          2156913 Y      2/1994
CN          1222867 A      7/1999

(Continued)

OTHER PUBLICATIONS

Tencent Technology, ISRWO, PCT/CN2014/082017, dated Oct. 14, 2014, 8 pgs.

(Continued)

*Primary Examiner* — Corbett B Coburn
(74) *Attorney, Agent, or Firm* — Morgan, Lewis & Bockius LLP

(57) ABSTRACT

Method and device of displaying a game are disclosed. The method includes: receiving a first user input pausing a game in progress; in response to receiving the first user input pausing the game in progress, switching the game from a normal state to a pause state; detecting a second user input resuming the game from the pause state; and in response to detecting the second user input resuming the game from the pause state: switching the game from the pause state to a transition state, wherein during the transition state, the game progresses at a slower rate than a game progress rate associated with the normal state at or prior to the receipt of the first user input; and switching the game from the transition state to the normal state in accordance with predetermined criterion.

18 Claims, 5 Drawing Sheets

(56) References Cited

U.S. PATENT DOCUMENTS

| | | | |
|---|---|---|---|
| 2008/0114645 A1* | 5/2008 | Zalewski | G06Q 30/02 705/14.5 |
| 2010/0009747 A1* | 1/2010 | Reville | A63F 13/12 463/31 |
| 2010/0124993 A1* | 5/2010 | Acres | G07F 17/32 463/43 |
| 2012/0088562 A1 | 4/2012 | Mohammed et al. | |
| 2015/0231510 A1* | 8/2015 | Hain | A63F 13/86 463/31 |

FOREIGN PATENT DOCUMENTS

| | | |
|---|---|---|
| CN | 101006417 A | 7/2007 |
| CN | 101383961 A | 3/2009 |
| CN | 102568021 A | 7/2012 |
| EP | 0368628 A2 | 5/1990 |

OTHER PUBLICATIONS

Tencent Technology, IPRP, PCT/CN2014/082017, dated Mar. 29, 2016, 5 pgs.

\* cited by examiner

METHOD AND DEVICE FOR DISPLAYING FRAMES OF A GAME

PRIORITY CLAIM AND RELATED APPLICATIONS

This application is a continuation application of PCT Patent Application No. PCT/CN2014/082017, entitled "METHOD AND DEVICE FOR DISPLAYING FRAMES OF A GAME" filed on Jul. 11, 2014, which claims priority to Chinese Patent Application No. 201310437118.6, entitled "METHOD AND DEVICE FOR DISPLAYING FRAMES OF A GAME," filed on Sep. 23, 2013, both of which are incorporated by reference in their entirety.

TECHNICAL FIELD

The disclosed implementations relate generally to the field of software applications, and in particular, to methods and devices for displaying frames of a game.

BACKGROUND

Currently, a problem exists in all competitive games on the market (such as a series of Need for Speed on a Personal Computer (PC) terminal, and Temple Run and GunZ Dash on a mobile terminal). It is that there is no buffering adaptive process for a player when the player resumes a game from a pause state. This problem affects user's performance in the game.

Generally, in a competitive game, the progress rate or difficulty of a game increases as a user plays the game. However, after pressing a pause key, the player is hard to get into the normal level of alertness and responsiveness very well. Although some games provide a three-second countdown for the player to prepare before the game resumes the normal state, the player still cannot exactly remember and adapt to the game progress rate. Therefore, a pause operation becomes a high risk operation and with the worst experience in competitive games.

Furthermore, for a solution of countdown, the game and a corresponding user interface still cannot identify any user inputs. After the buffering countdown is finished, the game continuously goes on. The game player has difficulty in immediately responding to the user interface in which the frames suddenly move. It will also adversely affect the game experience of players.

With respect to the foregoing problem, no effective solution has been proposed.

SUMMARY

In some embodiments, a method of displaying a game is performed at a device having one or more processors and memory storing instructions for execution by the one or more processors. The method includes: receiving a first user input pausing a game in progress; in response to receiving the first user input pausing the game in progress, switching the game from a normal state to a pause state; detecting a second user input resuming the game from the pause state; and in response to detecting the second user input resuming the game from the pause state: switching the game from the pause state to a transition state, wherein during the transition state, the game progresses at a slower rate than a game progress rate associated with the normal state at or prior to the receipt of the first user input; and switching the game from the transition state to the normal state in accordance with predetermined criterion.

In another aspect, a device comprises one or more processors, memory, and one or more program modules stored in the memory and configured for execution by the one or more processors. The one or more program modules include instructions for performing the method described above. In another aspect, a non-transitory computer readable storage medium having stored thereon instructions, which, when executed by a device, cause the device to perform the method described above.

BRIEF DESCRIPTION OF DRAWINGS

The aforementioned implementation of the present application as well as additional implementations will be more clearly understood as a result of the following detailed description of the various aspects of the present application when taken in conjunction with the drawings. Like reference numerals refer to corresponding parts throughout the several views of the drawings.

DETAILED DESCRIPTION

In order to enable persons skilled in the art to have a better understanding of technical solutions, the following will clearly and completely describe the technical solutions in accordance with some embodiments with reference to the accompanying drawings in accordance with some embodiments. Apparently, the described embodiments are a part rather than all of the embodiments of the present application. All other embodiments received by a person of ordinary skill in the art based on the embodiments of the present application without creative efforts shall fall within the protection scope of the present application.

Figure 1:
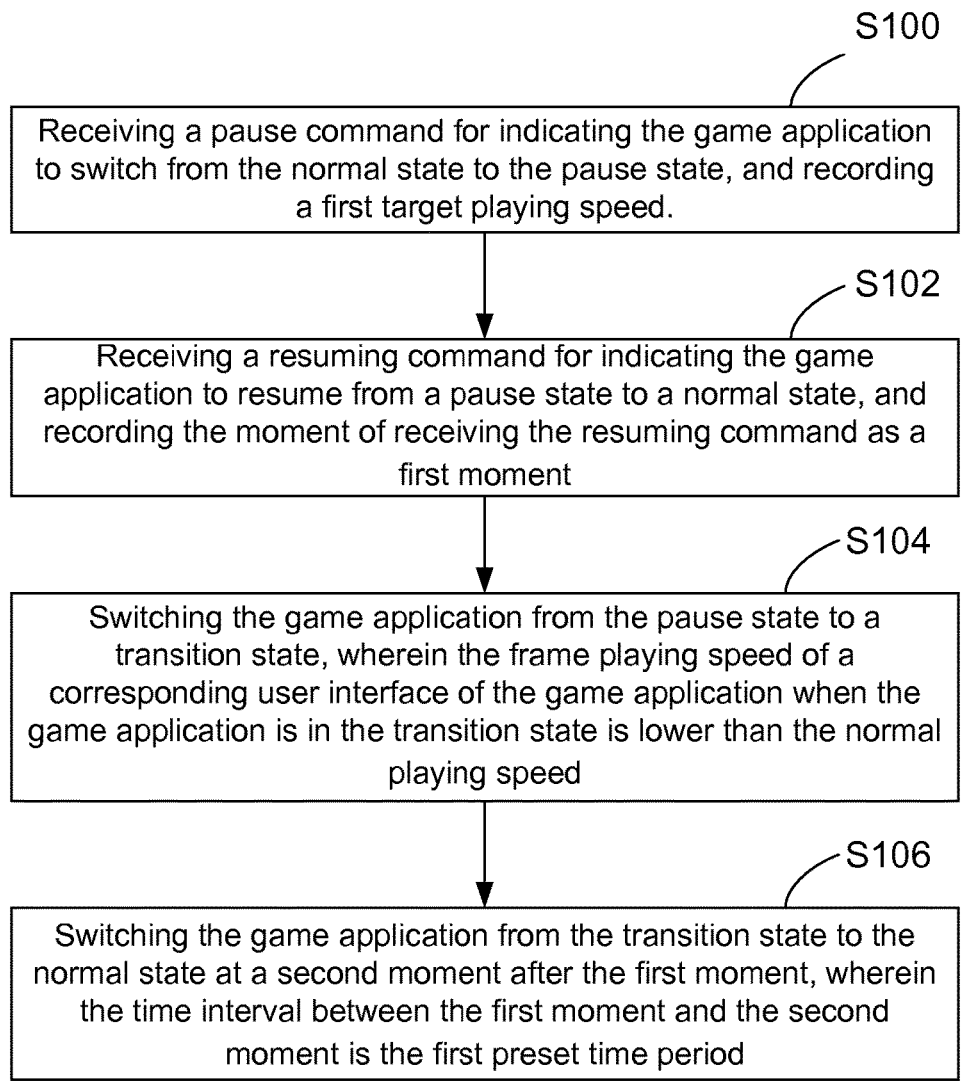
FIG. 1 is a flowchart of a method of displaying a game in accordance with some embodiments.

In accordance with some embodiments, a method for playing frames of a game is provided. As shown in FIG. 1, the method comprises the following steps.

In step S100, in accordance with some embodiments, a device receives a pause input for switching the game from the normal state to the pause state, and records a first target playing progress rate, wherein the first target playing progress rate represents the game progress rate immediately before or exactly when the game is switched from the normal state to the pause state.

In step S102, in accordance with some embodiments, the device receives a user input for resuming the game from a pause state to a normal state, and records the moment of obtaining the resuming input as a first moment.

In step S104, in accordance with some embodiments, the device switches the game from the pause state to a transition state, wherein the game progress rate when the game is in the transition state is slower than the normal progress rate. The normal progress rate represents the progress rate in the normal state.

In step S106, in accordance with some embodiments, the device switches the game from the transition state to the normal state at a second moment, wherein the time interval between the first moment and the second moment is the first preset time period (e.g., 30 seconds).

In accordance with some embodiments, the resuming input is received from an input apparatus. For example, for a game running in a mobile terminal with a touch-screen function, such as a smart phone or a tablet personal computer, the resuming input is received from identification to a touch operation at a certain specific area of a touch screen. The specific area may correspond to a Resume key and the like displayed on a user interface of the game. The resuming input is received from another input apparatus, such as a mouse, a keyboard, a rocker and a voice recognition apparatus. In accordance with some embodiments, the resuming input may also be received from a server, another mobile terminal or fixed terminal unit.

In accordance with some embodiments, the first moment is used as a reference time point for judging the time that the game is switched to the normal state in the step S106. However, in accordance with some embodiments, the first moment may also be used for controlling the progress rate in the transition state.

In accordance with some embodiments, the game is switched from the pause state to the transition state in the step S104. The game progress rate is lower than a normal progress rate when the game is in the transition state, and the normal progress rate represents the game progress rate in the normal state.

In accordance with some embodiments, it is distinguished from the prior art that a resuming state in the step S104 is adopted in a processing mode different from the buffering countdown in the prior art. In accordance with some embodiments, when the game is in the transition state, the progress rate is between the zero and the normal progress rate. Therefore, a user may more easily adapt to the progress rate. The technical problem that the game player is hard to immediately respond to the suddenly increased progress rate is solved.

More particularly, as an implementation mode, a game running in a mobile device may control a progress rate by changing a parameter "timescale," corresponding to a frame rate, the number of frames played by the game per second. Controlling the progress rate through the frame rate may also be applied to Flash-based games and any other games display videos by showing frames.

In accordance with some embodiments, the progress rate is controlled by reducing the update progress rate of output parameters or the change rate of updated output parameters of the game. Some current games are already provided with a built-in module for regulating the game progress rate and the progress rate is controlled by directly invoking the module.

Furthermore, in accordance with some embodiments, in the step S106, the game is switched from the transition state to the normal state at a second moment after the first moment.

In accordance with some embodiments, various parameters of the game in the normal state, in particular the progress rate, should correspond to those parameters before the game enters the pause state.

In accordance with some embodiments, various parameters and the progress rate in the normal state are influenced by the received operating inputs in the transition state. For example, the user performs an acceleration operation in the transition state and the progress rate increases. Therefore, the progress rate in the normal state may also be higher than the progress rate before the pause state.

In accordance with some embodiments, a plurality of modes may be provided for the control policy of the progress rate in the step S104. For example, the current progress rate may be calculated according to a preset function iteration mode. In accordance with some embodiments, the current progress rate may correspond to the elapsed time after the game obtains the resuming input.

In accordance with some embodiments, the step S104 may comprise: regulating the progress rate according to the time interval between the current moment and the first moment when the game is in the transition state, wherein the progress rate is increased along with the elapsed time.

In accordance with some embodiments, the progress rate at a starting moment of the transition state is at a lower level, but the progress rate at an ending moment of the transition state is back to a higher level. Therefore, in accordance with some embodiments, a user more easily adapts the progress rate of the user interface through the low-to-high increasing of the progress rate, resulting in improvement on the user experience.

In accordance with some embodiments, S104 further comprises: linearly increasing a progress rate factor when the game is in the transition state, wherein the progress rate is equal to the product of the normal progress rate and the progress rate factor. The progress rate factor is set to a first factor threshold when the game is switched from the pause state to the transition state, the progress rate factor is 1 when the game is switched from the transition state to the normal state, and the first preset factor threshold is smaller than 1.

In accordance with some embodiments, S104 further comprises: linearly increasing the progress rate of the fame application. The progress rate is equal to the product of the first target playing progress rate and the first preset factor threshold when the game is switched from the pause state to the transition state. The progress rate is equal to the first target playing progress rate when the game is switched from the transition state to the normal state, and the first preset factor threshold is smaller than 1. In accordance with some embodiments, in the transition state, the progress rate linearly returns to the level before the transition state, which is the first target playing progress rate.

In accordance with some embodiments, the game may be a competitive game product, such as a running game or a car competitive game, and the competitive game product may be installed in a mobile terminal, such as a mobile phone or a tablet device.

If a user is playing the competitive game product, and the progress rate in the process of the game is at a higher level, at a fourth moment, the user touches an area displaying "pause" on a touch screen of the mobile terminal. Responding to the input, the touch screen or the mobile terminal sends a corresponding pause instruction to the game. Therefore, the game receives the pause input at the fourth moment and is switched from the normal state to the pause state.

Thereafter at the first moment, the user touches an area displaying "resume" on the touch screen again. Responding to the input, the touch screen or the mobile terminal sends a corresponding resuming instruction to the game. In the step S104, the game is switched from the pause state to the transition state. In the transition state, for the user, the game continuously goes on, but the progress rate is at a lower level at a starting stage of the transition state, and gradually increases to the normal level in the transition state as time elapses. At a third moment, the transition state is finished, and the game is switched to the normal state.

It is noted that the foregoing moments from "first," to "fourth," are not sequentially arranged in the timer axis, but in the order of the fourth moment, the first moment, the second moment and the third moment, so that it should be understood that the terms "first," "second," and the like called in accordance with some embodiments are merely used for convenient description.

In accordance with some embodiments, there is a problem that the user may reduce the progress rate by continuously inputting pause/resuming inputs.

For further solving the problem, in accordance with some embodiments, if the pause input corresponding to the resuming input is received when the game is in the transition state, the game replaces the first preset factor threshold with the second preset factor threshold. The second preset factor threshold is smaller than 1 and larger than the first preset factor threshold.

In accordance with some embodiments, if the pause input corresponding to the resuming input is received when the game is in the transition state, the game replaces the first preset time period with the third preset time period and the third preset time period is smaller than the first preset time period.

In accordance with some embodiments, the step S104 may further comprise: switching the game from the pause state to the transition state at a third moment after the first moment, and displaying the time interval between the current moment and the third moment on the corresponding user interface of the game. The time interval between the first moment and the third moment is the second preset time period, and the second preset time period is smaller than the first preset time period.

After the resuming input is received, the game is switched from the pause state to the transition state. Therefore, firstly a buffering countdown stage with the time duration equal to the first preset time period may be given to the user after the resuming input is received. Secondly a transition state stage with the time duration equal to the difference value of the second preset time period and the first preset time period is given to the user after the buffering countdown stage is finished. Then a former preparation period is further provided for the transition state. Therefore, the user more easily adapts the progress rate after the game resumes from the pause state.

From the foregoing description of the implementation modes, persons skilled in the art can clearly appreciate that the methods of the above embodiments may be implemented in software plus a necessary general hardware platform, or certainly in hardware (but the former is the best implementation mode in most cases). Based on such understanding, the technical solutions may be embodied in the form of a software product. This software product is stored in a storage medium (such as ROM/RAM, computer disk, or CD ROM), and comprises a number of instructions for making a terminal unit (i.e. mobile phone, computer, server or network equipment) to perform the methods of the various embodiments of the present application.

Figure 2:
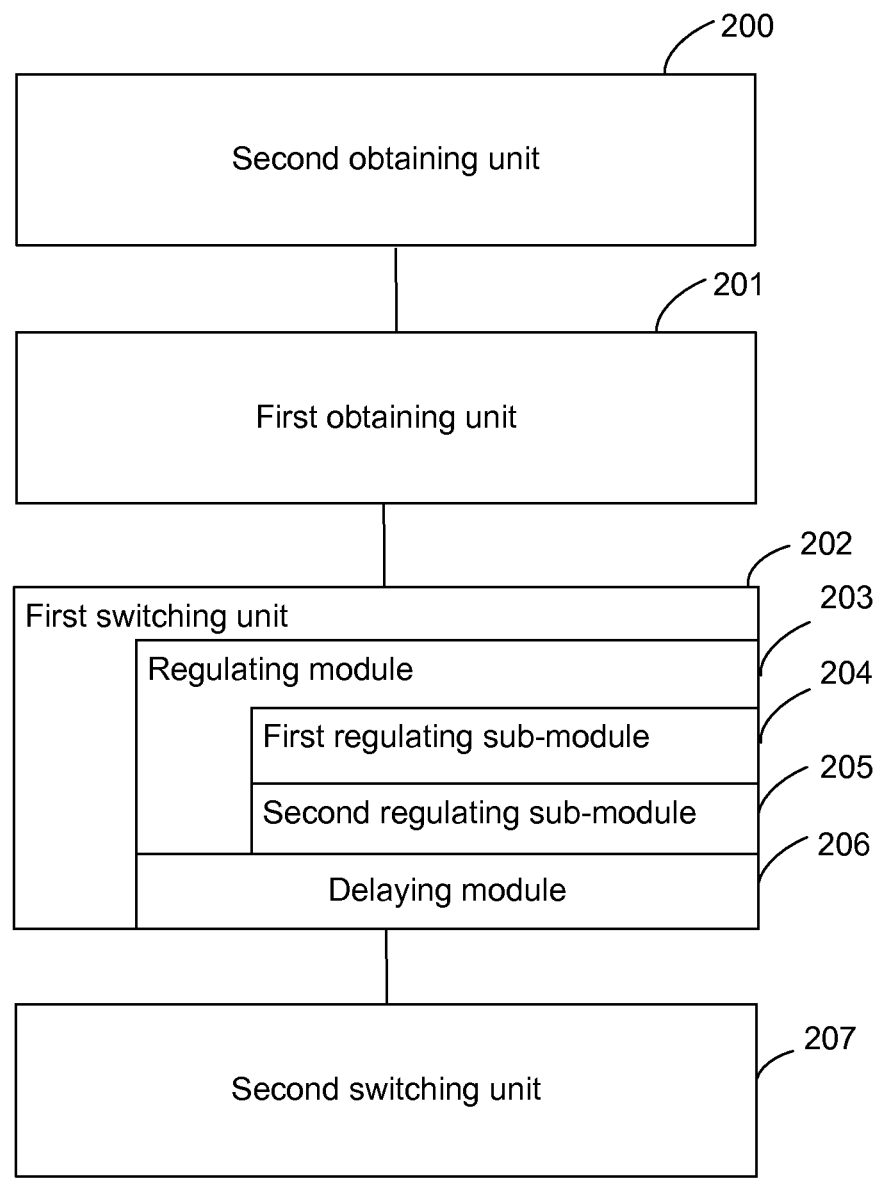
FIG. 2 is a schematic structural diagram of a device of displaying a game in accordance with some embodiments.

According to the embodiments of the present application, a device for implementing the method for displaying the game is further provided. As shown in FIG. 2, the device comprises:

(1) a first obtaining unit 201, used for obtaining a user input from resuming the game from a pause state, and recording the moment of obtaining the resuming input as a first moment;

(2) a first switching unit 202, used for switching the game from the pause state to a transition state; and (3) a second switching unit 207, used for switching the game from the transition state to the normal state at a second moment.

In accordance with some embodiments, the first switching unit 202 may comprise: a regulating module 203, used for regulating the progress rate according to the time interval between the current moment and the first moment when the game is in the transition state.

In accordance with some embodiments, the regulating module 203 may comprise: a first regulating sub-module 204, used for linearly increasing a progress rate factor when the game is in the transition state.

In accordance with some embodiments, the device may further comprise: a second obtaining unit 200, used for obtaining a pause input for switching the game from the normal state to the pause state, and recording a first target playing progress rate.

In accordance with some embodiments, the regulating module 203 may comprise: a second regulating sub-module 205, used for linearly increasing the progress rate.

In accordance with some embodiments, the first switching unit 202 may further comprise: a delaying module 206, used for switching the game from the pause state to the transition state, and displaying the time interval between the current moment and the third moment on the corresponding user interface of the game at the third moment after the first moment.

Figure 3:
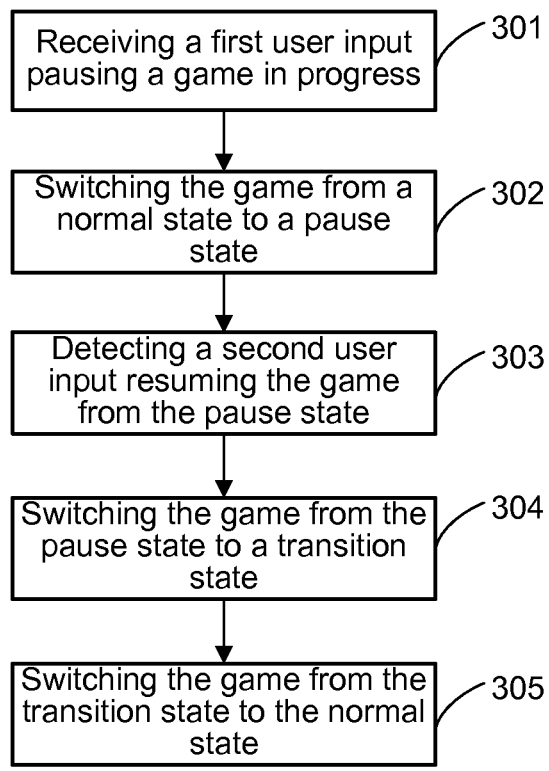
FIG. 3 is a flowchart of a method of displaying a game in accordance with some embodiments.
Figure 5A:
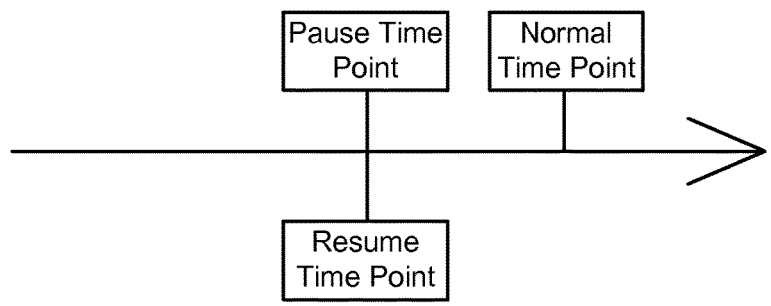
FIGS. 5A-5C are timelines of games in accordance with some embodiments.
Figure 5B:
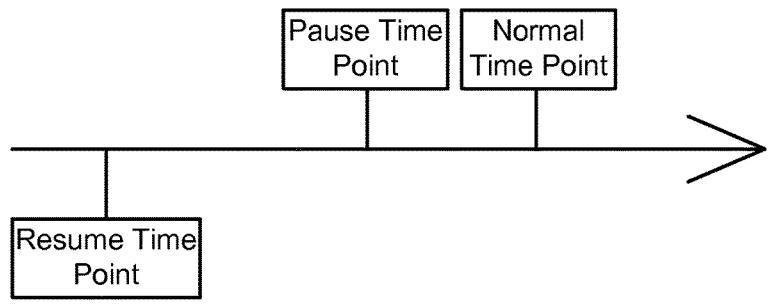
Figure 5C:
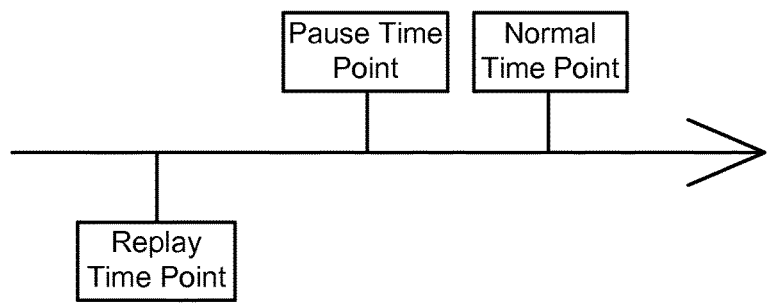

FIG. 3 is a flowchart of displaying a game in accordance with some embodiments. The method is performed at a device having one or more processors and memory storing instructions for execution by the one or more processors. FIGS. 5A-5C are timelines of games in accordance with different embodiments.

In step 301, in accordance with some embodiments, the device receives a first user input pausing a game in progress. In some embodiments, the first user input is a user stroking a particular key on a keyboard, selecting an icon in an interface or some voice command associated with a pause command of the game.

In step 302, in accordance with some embodiments, in response to receiving the first user input pausing the game in progress, the device switches the game from a normal state to a pause state. In some embodiments, a game in a pause state displays a static picture of the game (e.g., a score screen, an ad screen, a frozen frame of last scene in the game, etc.). In some embodiments, when the device switches the game from a normal state to a pause state, the device records conditions and progress of the game at the moment of the switching.

In some embodiments, a game in a normal state proceeds at a normal progress rate. A game can have either one or multiple normal progress rates. In some embodiments, if a game has multiple normal progress rates, the device records the game progress rate associated with the normal state at or prior to the receipt of the first user input. When the device switches the game from a transition state to a normal state, as described in step 305, the progress rate associated with the normal state is the recorded game progress rate.

In some embodiments, a game progress rate corresponds proportionally to the speed of movements of objects in the game, which objects include both those under a player's control and those outside of the player's control in the game. For example, in a car racing game, the objects include the car that the user controls, and the cars that are competing with the user in the same race. The objects may also include the background of the race scene, such as the obstacles, and various events occurring in the scene that affect the game performance of the user.

In step 303, in accordance with some embodiments, the device detects a second user input resuming the game from the pause state. In some embodiments, the second user input can be similar or the same to the first user input (e.g., a toggle switch can be implemented for the pause and resume functions of the game).

In step 304, in accordance with some embodiments, in response to detecting the second user input resuming the game from the pause state, a device switches the game from the pause state to a transition state, wherein during the transition state, the game progresses at a slower rate than the recorded game progress rate associated with the normal state at or prior to the receipt of the first user input. For example, during the transition, the game progress (e.g., how fast the background moves, and how fast the obstacles and enemies are coming toward the player, how fast the competitors are moving, etc.) can be artificially slowed down relative to the normal game progress rate at the normal state.

In some embodiments, the device calculates a respective progress rate of the game for a respective moment during the transition state from a pre-set formula that uses an elapsed time since a start of the transition state as an independent variable, and, at the respective moment, displays the game at the respective calculated progress rate. In some embodiments, the progress rate of the game increases over time during the transition time. For example, the progress rate increases linearly from zero to full progress rate of a normal state. The progress rate is in proportion to the elapsed time since the start of the transition state. If the transition state lasts 5 seconds, and the full progress rate of a normal state is 10, the progress rate R can be calculated as $R=2T$, wherein T is the number of seconds that elapsed time. Similarly, if the game displays a five-second video before it progresses, the formula is $R=2*(T-5)$. In addition, a formula can be set to reflect some non-linear relationship between the progress rate in the transition state and the elapsed time. For example, the progress rate can be calculated from a formula $R=[(10*T)^{\wedge}0.5]/10$. At last, a formula can be just a set of pre-determined progress rate set for every quarter second of the transition state. The formula specifies progress rate 0.3 at time 0.25, 0.7 at 0.5, 0.9 at 0.75, 1.5 at 1, 1.6 at 1.25, etc. The calculation based on the formula is finding a corresponding progress rate value at a particular moment.

In some embodiments, the device is configured to receive a user input to change the progress rate during the transition state. For example, a user may push a button to increase or decrease the game progress rate. Similarly, the device is configured to receive a user input to change the length of the transition state.

In accordance with some embodiments, changing the progress rate of the game over time during the transition state based on a current elapsed time since a start of the transition state and a current frequency of user operations detected during the transition state. For example, in a game that requires extensive user operations with high frequency, the frequency of user operation is an indicator whether the user has regained his/her performance level. The device adjusts the progress rate based on the detected frequency so as to provide a customized progress rate. In addition, in some embodiments, when the frequency of user operations and the elapsed time both reach certain level, the game switches back to a normal state.

In accordance with some embodiments, the device displays a current game progress rate while the game is in the transition state. In some embodiments, the current game progress rate is displayed relative to the recorded game progress rate associated with the normal state at the receipt of the first user input. In some embodiments, the device displays a current remaining duration of the transition state while the game progresses during the transition state. For example, the game displays a bar within the transition state and the fullness of bar may correspond to game progress rate, the game progress rate relative to the normal game progress rate or the remaining duration of the transition state.

There are at least three modes of transition states. A game may contain one or more of these modes in accordance with various embodiments.

In Mode 1, in accordance with some embodiments, the device resumes at a pause time point at which the game is paused. Therefore, when the game resumes, the game starts with the game progress that was saved at the moment that the game was paused. The timeline of Mode 1 is illustrated in FIG. 5A.

In Mode 2, in accordance with some embodiments, the device selects a resume time point before a pause time point at which the game was paused, obtains game progress at the resume time point from a recorded game history, and when switching the game from the pause state to the transition state, starts the game from the resume time point with the obtained game progress. Therefore, a user gets another chance to play the game in the period of time between the resume time point and the pause time point. In some embodiments, the resume time point is set to be a predetermined length of time before the pause time point (e.g., 30 seconds). The timeline of Mode 2 is illustrated in FIG. 5B.

In some embodiments, when the game is paused, the device obtains game history between the resume time point and the pause time point. When the game is resumed, the device displays a position of a game object corresponding to a respective elapsed time from a start of the transition state in accordance with the obtained game history. For example, in a car racing game, a user controls a car moving forward. In addition to displaying the car, the game also shows a shadow of a car moving in a way that is identical to how the car moves in the game history. In this way, a user can recognize that whether the speed of car is catching up the speed when he played the exact situation last time.

In Mode 3, in accordance with some embodiments, the device selects a replay time point that is before a pause time point at which the game was paused, obtains respective game history between the replay time point and the pause time point, and displays a video of the obtained game history. Therefore, the device displays a video before resuming the game. In some embodiments, the transition state includes both the video displaying time and speed changing time. In some embodiments, the transition state includes only the speed changing time. The timeline of Mode 3 is illustrated in FIG. 5C.

In step 305, in accordance with some embodiments, the device switches the game from the transition state to the normal state in accordance with predetermined criterion. As described above, in accordance with various embodiments, the predetermined criterion may include the elapsed time, the frequency of user operations, the progress of the game, etc. In addition, in some embodiments, the predetermined criterion includes receiving user input for switching to the normal state immediately.

Figure 4:
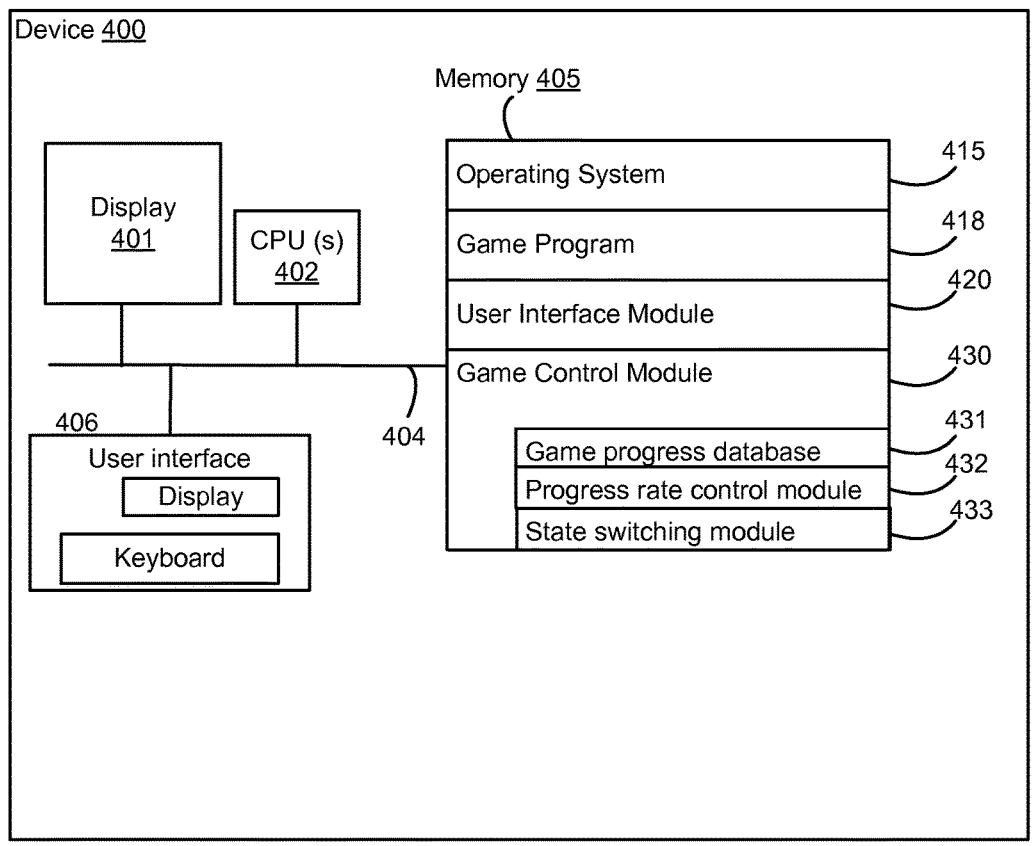
FIG. 4 is a schematic structural diagram of a device of displaying a game in accordance with some embodiments.

FIG. 4 is a diagram of an example implementation of a device 400 in accordance with some embodiments. In some embodiments, the device 400 includes one or more processing units (CPU's) 402, a display 401, memory 405, and one or more communication buses 404 for interconnecting these and various other components. The communication buses may include circuitry (sometimes called a chipset) that interconnects and controls communications between system components. The memory 405 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 405 may optionally include one or more storage devices remotely located from the CPU(s) 402. The memory 405, including the non-volatile and volatile memory device(s) within the memory 405, comprises a non-transitory computer readable storage medium.

In some implementations, the memory 405 or the non-transitory computer readable storage medium of the memory 405 stores the following programs, modules and data structures, or a subset thereof including an operating system 415, a game program 418, a user interface module 420, and a web program 430.

The user interface module 420 is configured to receive user inputs through the user interface 406.

In accordance with some embodiments, the game control module 430 is configured to switch the game from one state to another state and control the progress rate during the transition state. The game control module 430 comprises a game progress database 431, a progress rate control module 432 and a state switching module 433. The game progress database 431 is configured to store game parameters (including game progress rates), game progresses, game histories, game videos, etc. The progress rate control module 432 is configured to determine the progress rate of a game in a transition state. In some embodiments, the progress rate control module 432 contains one or more formulas to calculate the progress rate at a particular moment. The state switching module 433 is configured to switch the game from one state to another.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the present application to the precise forms disclosed. Many modifications and variations are possible in view of the above teachings. The implementations were chosen and described in order to best explain principles of the present application and its practical applications, to thereby enable others skilled in the art to best utilize the present application and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of displaying a game, comprising:
at a device having one or more processors and memory for storing one or more programs to be executed by the one or more processors:
receiving a first user input pausing a game in progress;
in response to receiving the first user input pausing the game in progress, switching the game from a normal state to a pause state;
detecting a second user input resuming the game from the pause state; and
in response to detecting the second user input resuming the game from the pause state:
switching the game from the pause state to a transition state, wherein during the transition state, the game progresses at a slower rate than a game progress rate associated with the normal state at or prior to the receipt of the first user input;
calculating a respective progress rate of the game for a respective moment during the transition state from a pre-set formula that uses an elapsed time since a start of the transition state as an independent variable; and
at the respective moment, displaying the game at the respective calculated progress rate; and
switching the game from the transition state to the normal state in accordance with a predetermined criterion.

2. The method of claim 1, further comprising:
when switching the game from the normal state to the pause state, recording the game progress rate associated with the normal state at or prior to the receipt of the first user input.

3. The method of claim 1, further comprising:
increasing the progress rate of the game over time during the transition state.

4. The method of claim 1, further comprising:
displaying a current game progress rate while the game is in the transition state.

5. The method of claim 1, wherein the current game progress rate is displayed relative to the recorded game progress rate associated with the normal state at the receipt of the first user input.

6. The method of claim 1, further comprising:
displaying a current remaining duration of the transition state while the game progresses during the transition state.

7. The method of claim 1, further comprising:
selecting a resume time point before a pause time point at which the game is paused;
obtaining game progress at the resume time point from a recorded game history; and
when switching the game from the pause state to the transition state, starting the game from the resume time point with the obtained game progress.

8. The method of claim 7, further comprising:
obtaining game history between the resume time point and the pause time point, and
displaying a position of a game object corresponding to a respective elapsed time from a start of the transition state in accordance with the obtained game history.

9. The method of claim 1, further comprising:
selecting a replay time point that is before a pause time point at which the game is paused;
obtaining respective game history between the replay time point and the pause time point; and displaying a video of the obtained game history during the transition state.

10. The method of claim 1, further comprising:
changing the progress rate of the game over time during the transition state based on a current elapsed time since a start of the transition state and a current frequency of user operations detected during the transition state.

11. A device of displaying navigational content in a web interface, comprising:
one or more processors; and
memory storing one or more programs for execution by the one or more processors, the one or more programs including instructions for:
receiving a first user input pausing a game in progress;
in response to receiving the first user input pausing the game in progress, switching the game from a normal state to a pause state;
detecting a second user input resuming the game from the pause state; and
in response to detecting the second user input resuming the game from the pause state:
switching the game from the pause state to a transition state, wherein during the transition state, the game progresses at a slower rate than a game progress rate associated with the normal state at or prior to the receipt of the first user input;
calculating a respective progress rate of the game for a respective moment during the transition state from a pre-set formula that uses an elapsed time since a start of the transition state as an independent variable; and
at the respective moment, displaying the game at the respective calculated progress rate; and
switching the game from the transition state to the normal state in accordance with a predetermined criterion.

12. The device of claim 11, wherein the one or more program modules further include instructions for:
when switching the game from a normal state to a pause state, recording the game progress rate associated with the normal state at or prior to the receipt of the first user input.

13. The device of claim 11, wherein the one or more program modules further include instructions for:
increasing the progress rate of the game over time during the transition state.

14. The device of claim 11, wherein the current game progress rate is displayed relative to the recorded game progress rate associated with the normal state at the receipt of the first user input.

15. The device of claim 11, wherein the one or more program modules further include instructions for:
displaying a current remaining duration of the transition state while the game progresses during the transition state.

16. The device of claim 11, wherein the one or more program modules further include instructions for:
selecting a resume time point before a pause time point at which the game is paused;
obtaining game progress at the resume time point from a recorded game history; and
when switching the game from the pause state to the transition state, starting the game from the resume time point with the obtained game progress.

17. The device of claim 11, wherein the one or more program modules further include instructions for:
selecting a replay time point that is before a pause time point at which the game is paused;
obtaining respective game history between the replay time point and the pause time point; and
displaying a video of the obtained game history during the transition state.

18. A non-transitory computer readable storage medium having instructions stored thereon, the instructions, when executed by one or more processors, cause the processors to perform operations comprising:
receiving a first user input pausing a game in progress;
in response to receiving the first user input pausing the game in progress, switching the game from a normal state to a pause state;
detecting a second user input resuming the game from the pause state; and
in response to detecting the second user input resuming the game from the pause state:
switching the game from the pause state to a transition state, wherein during the transition state, the game progresses at a slower rate than a game progress rate associated with the normal state at or prior to the receipt of the first user input;
calculating a respective progress rate of the game for a respective moment during the transition state from a pre-set formula that uses an elapsed time since a start of the transition state as an independent variable; and
at the respective moment, displaying the game at the respective calculated progress rate; and
switching the game from the transition state to the normal state in accordance with a predetermined criterion.

* * * * *